(12) United States Patent
Popovich et al.

(10) Patent No.: US 10,732,266 B2
(45) Date of Patent: *Aug. 4, 2020

(54) HOLOGRAGHIC WAVEGUIDE LIDAR

(71) Applicant: DigiLens Inc., Sunnyvale, CA (US)

(72) Inventors: Milan Momcilo Popovich, Leicester (GB); Jonathan David Waldern, Los Altos Hills, CA (US); Alastair John Grant, San Jose, CA (US)

(73) Assignee: DigiLens Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,900

(22) Filed: Jun. 24, 2019

(65) Prior Publication Data
US 2019/0361096 A1 Nov. 28, 2019

Related U.S. Application Data

(63) Continuation of application No. 15/543,011, filed as application No. PCT/GB2016/000014 on Jan. 19, 2016, now Pat. No. 10,330,777.
(Continued)

(51) Int. Cl.
*G02B 6/12* (2006.01)
*G02B 6/34* (2006.01)
*G02B 26/10* (2006.01)
*G01S 17/88* (2006.01)
*G01S 17/89* (2020.01)
(Continued)

(52) U.S. Cl.
CPC ............ *G01S 7/4817* (2013.01); *G01S 17/42* (2013.01); *G02B 6/12002* (2013.01); *G02B 6/34* (2013.01); *G02B 26/0808* (2013.01); *G02B 26/106* (2013.01); *G02B 27/0093* (2013.01);
(Continued)

(58) Field of Classification Search
None
See application file for complete search history.

(56) References Cited

U.S. PATENT DOCUMENTS 3,804,496 A 4/1974 Crane et al.
4,028,725 A 6/1977 Lewis
(Continued)

FOREIGN PATENT DOCUMENTS

CN 107873086 A 4/2018
CN 109073889 A 12/2018
(Continued)

OTHER PUBLICATIONS

International Preliminary Report on Patentability for International Application No. PCT/GB2016/000051, Report dated Sep. 19, 2017, dated Sep. 28, 2017, 7 Pgs.
(Continued)

*Primary Examiner* — Michelle R Connelly
(74) *Attorney, Agent, or Firm* — KPPB LLP

(57) ABSTRACT

A holographic waveguide LIDAR comprises a transmitter waveguide coupled to a beam deflector and a receiver waveguide coupled to a detector module. The transmitter waveguide contains an array of grating elements for diffracting a scanned laser beam into a predefined angular ranges. The receiver waveguide contains an array of grating elements for diffracting light reflected from external points within a predefined angular range towards the detector module.

20 Claims, 7 Drawing Sheets

Related U.S. Application Data

(60) Provisional application No. 62/125,351, filed on Jan. 20, 2015.

(51) Int. Cl.
    *G06F 3/01*     (2006.01)
    *G01S 7/481*     (2006.01)
    *G01S 17/42*     (2006.01)
    *G02B 26/08*     (2006.01)
    *G02B 27/00*     (2006.01)

(52) U.S. Cl.
CPC .............. *G06F 3/013* (2013.01); *G01S 17/88* (2013.01); *G01S 17/89* (2013.01); *G02B 2006/12138* (2013.01)

(56) References Cited

U.S. PATENT DOCUMENTS

| | | |
|---|---|---|
| 4,852,988 A | 8/1989 | Velez et al. |
| 4,994,204 A | 2/1991 | Doane et al. |
| 5,315,324 A | 5/1994 | Kubelik et al. |
| 5,410,376 A | 4/1995 | Cornsweet et al. |
| 5,516,455 A | 5/1996 | Jacobine et al. |
| 5,585,035 A | 12/1996 | Nerad et al. |
| 6,014,187 A | 1/2000 | Taketomi et al. |
| 6,069,728 A | 5/2000 | Huignard et al. |
| 6,268,839 B1 | 7/2001 | Yang et al. |
| 6,351,273 B1 | 2/2002 | Lemelson et al. |
| 6,677,086 B1 | 1/2004 | Sutehrland et al. |
| 7,018,686 B2 | 3/2006 | Sutehrland et al. |
| 7,542,210 B2 | 6/2009 | Chirieleison |
| 8,354,640 B2 * | 1/2013 | Hamre .................. G02F 1/1326 250/338.1 |
| 8,929,589 B2 | 1/2015 | Publicover et al. |
| 9,429,692 B1 | 8/2016 | Saarikko et al. |
| 9,456,744 B2 | 10/2016 | Popovich et al. |
| 9,513,480 B2 | 12/2016 | Saarikko et al. |
| 9,535,253 B2 | 1/2017 | Levola et al. |
| 9,804,389 B2 | 10/2017 | Popovich et al. |
| 10,209,517 B2 | 2/2019 | Popovich et al. |
| 10,234,696 B2 | 3/2019 | Popovich et al. |
| 10,241,330 B2 | 3/2019 | Popovich et al. |
| 10,330,777 B2 * | 6/2019 | Popovich .................. G02B 6/34 |
| 10,423,222 B2 | 9/2019 | Popovich et al. |
| 10,437,051 B2 | 10/2019 | Popovich et al. |
| 2002/0075240 A1 | 6/2002 | Lieberman et al. |
| 2002/0167462 A1 | 11/2002 | Lewis et al. |
| 2006/0221063 A1 | 10/2006 | Ishihara |
| 2007/0070504 A1 | 3/2007 | Akutsu et al. |
| 2010/0202725 A1 | 8/2010 | Popovich et al. |
| 2012/0027347 A1 | 2/2012 | Mathal et al. |
| 2013/0312811 A1 | 11/2013 | Aspnes et al. |
| 2014/0198896 A1 | 7/2014 | Hemmendorff et al. |
| 2014/0268353 A1 | 9/2014 | Fujimura et al. |
| 2015/0289762 A1 | 10/2015 | Popovich et al. |
| 2016/0209657 A1 | 7/2016 | Popovich et al. |
| 2017/0031160 A1 | 2/2017 | Popovich et al. |
| 2018/0003805 A1 | 1/2018 | Popovich et al. |
| 2018/0113303 A1 | 4/2018 | Popovich et al. |
| 2018/0120669 A1 | 5/2018 | Popovich et al. |
| 2018/0143449 A1 | 5/2018 | Popovich et al. |
| 2018/0232048 A1 | 8/2018 | Popovich et al. |
| 2018/0275402 A1 | 9/2018 | Popovich et al. |
| 2019/0041634 A1 | 2/2019 | Popovich et al. |
| 2019/0064735 A1 | 2/2019 | Waldern et al. |
| 2019/0072723 A1 | 3/2019 | Waldern et al. |
| 2019/0179153 A1 | 6/2019 | Popovich et al. |

FOREIGN PATENT DOCUMENTS

| | | |
|---|---|---|
| DE | 10221837 A1 | 12/2003 |
| EP | 1347641 A1 | 9/2003 |
| EP | 3198192 A1 | 8/2017 |
| EP | 3245444 A1 | 11/2017 |
| EP | 3245551 A2 | 11/2017 |
| EP | 3398007 A1 | 11/2018 |
| JP | H05066427 A | 3/1993 |
| JP | H05224018 A | 9/1993 |
| JP | 0766383 A | 3/1995 |
| JP | H10503279 A | 3/1998 |
| JP | 2012163642 A | 8/2012 |
| WO | 2000023832 A1 | 4/2000 |
| WO | 2008011066 A2 | 1/2008 |
| WO | 2008011066 A9 | 5/2008 |
| WO | 2008100545 A2 | 8/2008 |
| WO | 2008011066 A3 | 12/2008 |
| WO | 2007130130 A3 | 9/2009 |
| WO | 2010078856 A1 | 7/2010 |
| WO | 2011042711 A3 | 4/2011 |
| WO | 2013163347 A1 | 10/2013 |
| WO | 2016113533 A2 | 7/2016 |
| WO | 2016113533 A3 | 10/2016 |
| WO | 2017134412 A1 | 8/2017 |

OTHER PUBLICATIONS

International Preliminary Report on Patentability for International Application PCT/GB2013/000005, dated Jul. 8, 2014, dated Jul. 17, 2014, 12 pgs.
International Preliminary Report on Patentability for International Application PCT/GB2013/000210, dated Nov. 11, 2014, dated Nov. 20, 2014, 6 pgs.
International Preliminary Report on Patentability for International Application PCT/GB2014/000197, dated Nov. 24, 2015, dated Dec. 3, 2015, 7 pgs.
International Preliminary Report on Patentability for International Application PCT/GB2016/000003, dated Jul. 18, 2017, dated Jul. 27, 2017, 11 Pgs.
International Preliminary Report on Patentability for International Application PCT/GB2017/000015, Report Completed Aug. 7, 2018, dated Aug. 16, 2018, 7 Pgs.
International Search Report and Written Opinion for International Application No. PCT/GB2017/000015, Search completed Apr. 25, 2017, dated May 8, 2017, 10 Pgs.
International Search Report for PCT/GB2013/000005, completed by the European Patent Office on Jul. 16, 2013, 3 pgs.
International Search Report for PCT/GB2013/000210, completed by the European Patent Office on Aug. 12, 2013, 3 pgs.
International Search Report for PCT/GB2014/000197, Completed by the European Patent Office on Jul. 31, 2014, 3 Pgs.
International Search Report for PCT/GB2016/000003, Completed by the European Patent Office May 31, 2016, 5 pgs.
International Search Report for PCT/GB2016/000051, Completed Aug. 11, 2016, 3 Pgs.
Written Opinion for International Application No. PCT/GB2014/000197, Search completed Jul. 31, 2014, dated Aug. 7, 2014, 6 Pgs.
Written Opinion for International Application No. PCT/GB2016/000051, Search completed Aug. 11, 2016 , dated Aug. 22, 2016, 6 Pgs.
Written Opinion for International Application PCT/GB2013/000210, completed Aug. 12, 2013, dated Aug. 20, 2013, 5 pgs.
Written Opinion for International Application PCT/GB2016/000003, completed May 31, 2016, dated Aug. 12, 2016, 10 pgs.
Written Opinion for International Application PCT/GB2016/000005, search completed May 27, 2016, dated Jun. 6, 2016, 6 pgs.
Born et al., "Optics of Crystals", Principles of Optics 5th Edition 1975, pp. 705-707.
Domash et al., "Applications of switchable Poloroid holograms", SPIE Proceedings, vol. 2152, Diffractive and Holographic Optics Technology, Jan. 23-29, 1994, Los Angeles, CA, pp. 127-138, ISBN: 0-8194-1447-6.
Giancola, "Holographic Diffuser, Makes Light Work of Screen Tests", Photonics Spectra, 1996, vol. 30, No. 8, pp. 121-122.
Hariharan, "Optical Holography: Principles, techniques and applications", Cambridge University Press, 1996, pp. 231-233.
Hua et al., "A Closed Form Solution to Natural Image Matting", Illumination & Displays 3D Visualization and Imaging Systems Laboratory (3DVIS) College of Optical Sciences University of Arizona Tucson, 2014, 8 pgs.

(56) References Cited

OTHER PUBLICATIONS

Karasawa et al., "Effects of Material Systems on the Polarization Behavior of Holographic Polymer Dispersed Liquid Crystal Gratings", Japanese Journal of Applied Physics, Oct. 1997, vol. 36, No. 10, pp. 6388-6392.

Magarinos et al., "Wide Angle Color Holographic infinity optics display", Air Force Systems Command, Brooks Air Force Base, Texas, AFHRL-TR-80-53, Mar. 1981, 100 pgs.

Miller, "Coupled Wave Theory and Waveguide Applications", The Bell System Technical Journal, Short Hills, NJ, Feb. 2, 1954, 166 pgs.

Sagan et al., "Electrically Switchable Bragg Grating Technology for Projection Displays", Proc. SPIE. vol. 4294, Jan. 24, 2001, pp. 75-83.

Yaqoob et al., "High-speed two-dimensional laser scanner based on Bragg grating stored in photothermorefractive glass", Applied Optics, Sep. 10, 2003, vol. 42, No. 26, pp. 5251-5262.

\* cited by examiner

HOLOGRAGHIC WAVEGUIDE LIDAR

CROSS-REFERENCE TO RELATED APPLICATIONS

This application is a Continuation of U.S. patent application Ser. No. 15/543,011 filed Jul. 12, 2017, which is a U.S. National Phase of PCT Application No. PCT/GB2016/000014 filed Jan. 19, 2016, which claims the benefit of U.S. Provisional Application No. 62/125,351 filed Jan. 20, 2015, the disclosures of which are hereby incorporated by reference in their entireties.

BACKGROUND OF THE INVENTION

This invention relates to a sensor, and more particularly to a LIDAR using switchable gratings.

LIDAR is a remote-sensing technology that creates a 3D map of an environment by illuminating a target with a pulsed angularly-scanned laser and analyzing the reflected "point cloud". The advantages of LIDAR over cameras are well known. Since LIDAR uses emitted light, it is robust against interference from ambient light and has much higher resolution than radar. Artificial light sources are required for nighttime operation. Current computer vision is inadequate for complex scene representation and is susceptible to illumination variation. Currently, there is growing interest in LIDAR systems for a range of platforms including: cars (for applications such as collision avoidance and cruise control systems), robot vehicle, UAVs and wearable displays for night vision. The increasing use of key-hole procedures in surgery is also stimulating medical applications. An exemplary car LIDAR specification (based on the Velodyne® HDL64E LIDAR, manufactured by Velodyne®) has a FOV of 360° in azimuth; 26.5° elevation (+2° to −24.5°); a refresh rate of 15 Hz; a point cloud rate of 1 million points per second; a maximum range of 120 metres; a horizontal resolution of 0.05 degree; a distance error of less than 1 inch; a laser pulse duration of 5 nanoseconds and a power output of typically 60 watts. However, LIDAR equipment meeting this specification is extremely bulk and expensive. LIDAR operating at around 1.55 microns has the advantage of being eye safe with longer range capability but is even more expensive. Most current LIDAR equipment relies on bulky rotating optics technology. LIDAR systems based on imaging array technology have been developed but are currently very expensive. The inventors believe that the key to overcoming the problems of bulk and cost is waveguide optics based on switchable grating technology.

One important class of switchable gratings is based on Switchable Bragg Gratings (SBGs). SBGs are fabricated by first placing a thin film of a mixture of photopolymerizable monomers and liquid crystal material between parallel glass plates. One or both glass plates support electrodes, typically transparent indium tin oxide films, for applying an electric field across the film. A volume phase grating is then recorded by illuminating the liquid material (often referred to as the syrup) with two mutually coherent laser beams, which interfere to form a slanted fringe grating structure. During the recording process, the monomers polymerize and the mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the film. When an electric field is applied to the grating via transparent electrodes, the natural orientation of the LC droplets is changed causing the refractive index modulation of the fringes to reduce and the hologram diffraction efficiency to drop to very low levels. Typically, SBG Elements are switched clear in 30 µs. With a longer relaxation time to switch ON. Note that the diffraction efficiency of the device can be adjusted, by means of the applied voltage, over a continuous range. The device exhibits near 100% efficiency with no voltage applied and essentially zero efficiency with a sufficiently high voltage applied. In certain types of HPDLC devices magnetic fields may be used to control the LC orientation. In certain types of HPDLC phase separation of the LC material from the polymer may be accomplished to such a degree that no discernible droplet structure results.

SBGs may be used to provide transmission or reflection gratings for free space applications. SBGs may be implemented as waveguide devices in which the HPDLC forms either the waveguide core or an evanescently coupled layer in proximity to the waveguide. The parallel glass plates used to form the HPDLC cell provide a total internal reflection (TIR) light guiding structure. Light is "coupled" out of the SBG when the switchable grating diffracts the light at an angle beyond the TIR condition. Waveguides are currently of interest in a range of display and sensor applications. Although much of the earlier work on HPDLC has been directed at reflection, holograms transmission devices are proving to be much more versatile as optical system building blocks. Typically, the HPDLC used in SBGs comprise liquid crystal (LC), monomers, photoinitiator dyes, and coinitiators. The mixture frequently includes a surfactant. The patent and scientific literature contains many examples of material systems and processes that may be used to fabricate SBGs. Two fundamental patents are: U.S. Pat. No. 5,942,157 by Sutherland, and U.S. Pat. No. 5,751,452 by Tanaka et al. Both filings describe monomer and liquid crystal material combinations suitable for fabricating SBG devices. One of the known attributes of transmission SBGs is that the LC molecules tend to align normal to the grating fringe planes. The effect of the LC molecule alignment is that transmission SBGs efficiently diffract P polarized light (ie light with the polarization vector in the plane of incidence) but have nearly zero diffraction efficiency for S polarized light (ie light with the polarization vector normal to the plane of incidence. Transmission SBGs may not be used at near-grazing incidence as the diffraction efficiency of any grating for P polarization falls to zero when the included angle between the incident and reflected light is small.

There is a requirement for a compact, lightweight, low cost LIDAR capable of providing wide angle, high-resolution, long-range operation.

SUMMARY OF THE INVENTION

It is a first object of the invention to provide a compact, lightweight, low cost LIDAR capable of providing wide angle, high-resolution, long-range operation.

The objects of the invention are achieved in one embodiment of the invention in which there is provided a waveguide sensor, comprising: a source of first wavelength light; at least one beam deflector for scanning the light; a transmitter waveguide; a receiver waveguide; and a detector optically coupled to the receiver waveguide. The beam deflector is optically coupled to the transmitter waveguide and configured such that scanned light coupled into the transmitter waveguide executes angular sweeps about the principal diffraction directions of the grating elements. The transmitter waveguide contains a multiplicity of grating elements disposed in at least one grating layer. Each grating element is operative to diffract light into a predefined range of output directions. The receiver waveguide contains a multiplicity of grating elements disposed in at least one grating layer. Each grating element diffracts light reflected from external points and incident within a predefined angular range into a TIR path to the detector.

In some embodiments the grating elements in at least one of the transmitter waveguide or the receiver waveguide are elements of a two dimensional array.

In some embodiments the grating elements in at least one of the transmitter waveguide or the receiver waveguide are elements of a one dimensional array.

In some embodiments the grating elements in at least one of the transmitter waveguide or the receiver waveguide are elongate elements with longer dimensions aligned orthogonally to the propagation direction of the waveguides.

In some embodiments the grating elements in at least one of the transmitter waveguide or the receiver waveguide are electrically switchable.

In some embodiments the grating elements in at least one of the transmitter waveguide or the receiver waveguide have at least one of aspect ratio or surface area varying across the waveguide.

In some embodiments the receiver waveguide and the transmitter waveguide substantially overlap.

In some embodiments the transmitter waveguide and the receiver waveguide each contain grating elements having at least two different grating vectors.

In some embodiments at least one of the transmitter waveguide or the receiver waveguide contains grating layers operating over different angular ranges.

In some embodiments at least one of the transmitter waveguide or the receiver waveguide includes at least one grating layer containing a fold grating.

In some embodiments the transmitter waveguide and the receiver waveguide are combined into a single waveguide containing a multiplicity of grating elements disposed in at least one grating layer. Each grating element is operative to diffract the light into a predefined range of output directions. Each grating element diffracts light reflected from external points and incident within a predefined angular range into a TIR path to the detector.

In some embodiments the apparatus is configured to detect a 3D point cloud.

In some embodiments coupling between the scanner and the transmitter waveguide is performed by one of a prism, a grating, a switchable grating, or via edge coupling.

In some embodiments the beam deflector is a micro-electro-mechanical system.

In some embodiments the source is an infrared light emitting diode or an infrared laser. In some embodiments the first wavelength is approximately 1550 nm.

In some embodiments the grating is one of a Bragg grating, a surface relief grating or a switchable Bragg grating recorded in a HPDLC material, a uniform modulation HPDLC material or a reverse mode HPDLC material.

In some embodiments a waveguide LIDAR according to the principles of the invention forms a layer in a stack further comprising at least one of a waveguide HMD or a waveguide eye tracker.

In some embodiments the apparatus further comprises a beamsplitter for providing optical paths between the source and the transmitter waveguide and the detector and the receiver waveguide.

In some embodiments the detector is a heterodyne detection device.

A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

DETAILED DESCRIPTION OF THE INVENTION

The invention will now be further described by way of example only with reference to the accompanying drawings. It will apparent to those skilled in the art that the present invention may be practiced with some or all of the present invention as disclosed in the following description. For the purposes of explaining the invention well-known features of optical technology known to those skilled in the art of optical design and visual displays have been omitted or simplified in order not to obscure the basic principles of the invention. Unless otherwise stated the term "on-axis" in relation to a ray or a beam direction refers to propagation parallel to an axis normal to the surfaces of the optical components described in relation to the invention. In the following description the terms light, ray, beam and direction may be used interchangeably and in association with each other to indicate the direction of propagation of light energy along rectilinear trajectories. Parts of the following description will be presented using terminology commonly employed by those skilled in the art of optical design. It should also be noted that in the following description of the invention repeated usage of the phrase "in one embodiment" does not necessarily refer to the same embodiment.

LIDAR works by sending out short infrared laser pulses. The return signal can be used to build up a 3D map of an environment by timing the pulse return time. The basic optical components of a LIDAR system are a pulsed laser, a means for scanning the laser beam over a wide angle, a receiver means comprising optics and a detector for recording the return signal. The present invention addresses the problem of providing a passive, wide angle transmitter/receiver that eliminates the need to rotate the optical assembly. Instead, we use waveguides containing arrays of switchable gratings each optimized to collect signal over a predefined field of view range. It is not necessary to rotate the waveguides. The laser is scanned across each field of view range to provide the required angular resolution. By optimizing the laser scanning cycle to coincide with the duration of the diffracting state of each grating it is possible to build up a large field of view with a high (angular) resolution. The waveguide approach also brings the benefits of transparency, light weight and a very thin form factor. Furthermore, a waveguide LIDAR can be integrated with other waveguide devices such as displays and eye trackers in a thin stack. Advantageously, the LIDAR operates at 1550 which has the advantages of being eye safe and invisible to current night vision technology. However, the invention may be applied at any wavelength in the spectrum from UV to infrared. We will now discuss a series of exemplary embodiments of the invention.

Figure 1:
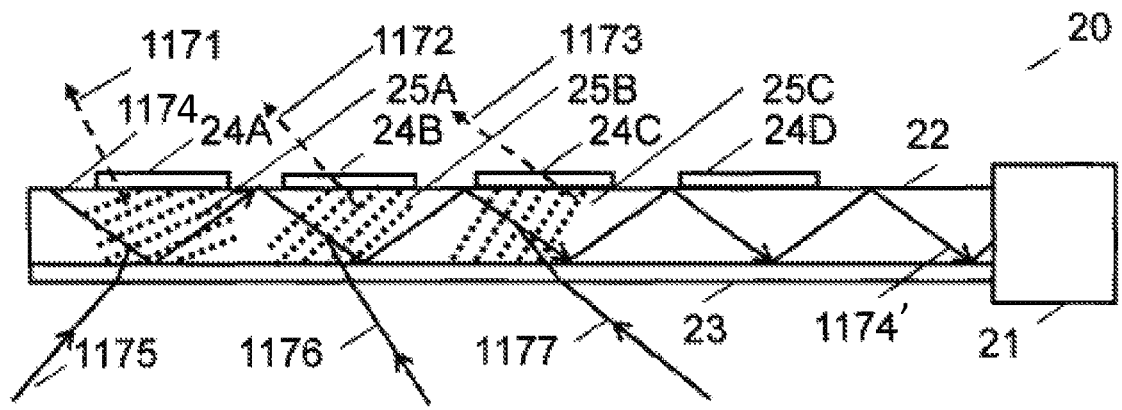
FIG. 1 is a schematic side view of a LIDAR receiver waveguide in one embodiment.

In one embodiment shown in FIG. 1 a LIDAR receiver waveguide 20 comprises the light detection module 21 a waveguide 22 with electrodes applied to opposing surfaces the electrodes comprising a common electrode 23 and an array of electrodes 24A-24D the two electrode layers sandwiching grating regions 25A-24C to form a switchable grating array. In one embodiment the grating array is two dimensional. In one embodiment the array comprises a one-dimensional array of column shaped elements. The detector module will typically comprise a lens and an infrared (IR) detector. Advantageously, the IR detector is a fast, high sensitivity device such as an avalanche photodiode. In many applications the preferred wavelength is 1550 nm which is eye safe and is invisible to current night vision devices. Each grating region has a unique k-vector (that is a vector normal to the Bragg fringes) as indicated by 1171-1173. The gratings in their diffracting state couple signal light into a TIR path inside the waveguide. The guided beam is coupled into the detector module, typically by a grating or prism. In one embodiment the IR detector is coupled to the end of the waveguide. Each grating has an angular detection field determined by the diffraction efficiency bandwidth of the grating. The principal rays of the fields of view of the grating elements 25A-25C are represented by 1175-1177. Typically, the field of view of a single element is in the region of 10-15 degrees. By switching the gratings to their active state sequentially the entire field of view is covered. For example, if we consider grating region 25A with k-vector 1171 sandwiched by the electrode 24A and the common electrode, when the grating is in its active state light 1175 is coupled into the TIR path indicated by the rays 1174, 1174' which are coupled into the detector module. Note that although in FIG. 1 (and in the embodiments to be described below) more than one grating is shown in a diffracting state, in practice only one grating region will be diffracting at any time.

In some embodiments the gratings are recorded in uniform modulation liquid crystal-polymer material system such as the ones disclosed in United State Patent Application Publication No.: US 2007/0019152 by Caputo et al and WIPO Publication No.: WO/2006/002870 by Stumpe et al. both of which are incorporated herein by reference in their entireties. Uniform modulation gratings are characterized by high refractive index modulation (and hence high diffraction efficiency) and low scatter. In some embodiments the gratings are recorded in a reverse mode HPDLC material. Reverse mode HPDLC differs from conventional HPDLC in that the grating is passive when no electric field is applied and becomes diffractive in the presence of an electric field. The reverse mode HPDLC may be based on any of the recipes and processes disclosed in WIPO Publication No.: WO/2013/027006, entitled IMPROVEMENTS TO HOLOGRAPHIC POLYMER DISPERSED LIQUID CRYSTAL MATERIALS AND DEVICES.

Figure 2:
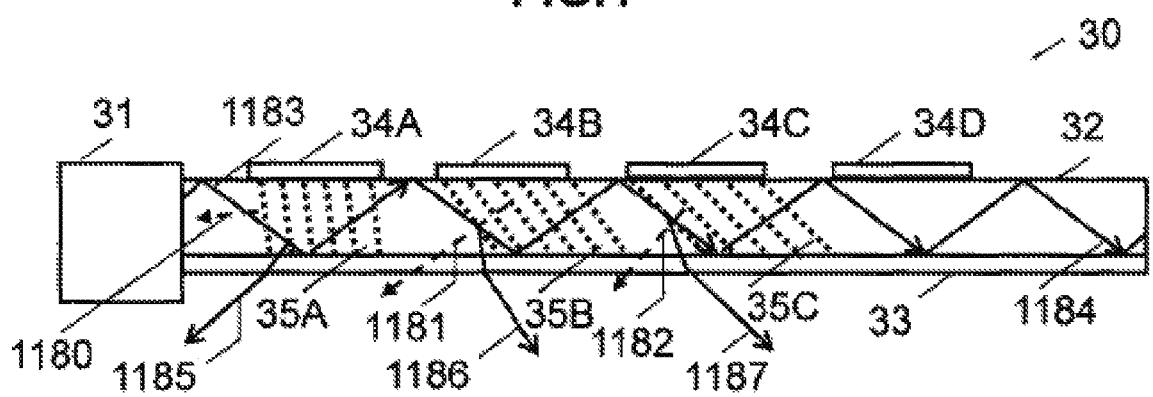
FIG. 2 is a schematic side view of a LIDAR transmitter waveguide in one embodiment.

In one embodiment shown in FIG. 2 a LIDAR transmitter waveguide 30 comprises a scanning module (beam deflector) 31 a waveguide 32 with electrodes applied to opposing surfaces, the electrodes comprising a common electrode 33 and an array of electrodes 34A-34D. The electrode layers sandwich the grating regions 35A-34C. The invention does not assume any particular beam scanning technology. At the time of writing this application the preferred technology is based on a micro electro mechanical system (MEMs). Exemplary MEMs scanners are manufactured by Lemoptix Inc. These devices can provide a resolution of 720p (1280× 720 pixels) at 60 Hz with scanning angles in excess of 60 degrees. Referring again to FIG. 2 the scanning beam is coupled into the waveguide by a grating or prism coupler. In one embodiment the beam may be coupled through the end of the waveguide. Each grating region has a unique k-vector (that is a vector normal to the Bragg fringes) as indicated by 1180-1182. The gratings in their diffracting state couple signal light into a TIR path inside the waveguide. Each grating has an angular detection field determined by the diffraction efficiency bandwidth. The principal rays of the fields of view of grating elements 35A-35C are represented by 1185-1187. Typically, the field of view of a single element is in the region 10-15 degrees. By switching the gratings to their active state sequentially the entire field of view is covered. For example, switching grating region 35A with k-vector 1180 is sandwiched by the electrode 34A and the common electrode which switches the grating region 35A between diffracting and non-diffracting states such that light 1185 is coupled out of the TIR path indicated by the rays 1183-1184.

Figure 3:
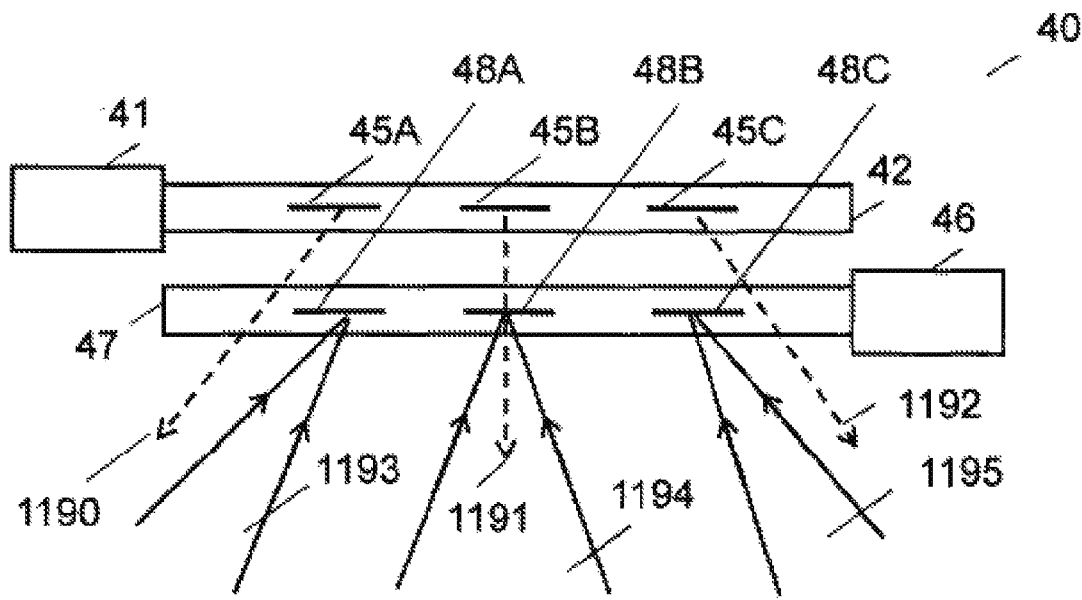
FIG. 3 is a schematic side view of a LIDAR comprising a transmitter waveguide and a receiver waveguide in one embodiment.

In one embodiment illustrated in the schematic side view of FIG. 3 a complete LIDAR 40 comprises receiver and transmitter waveguides based on the embodiments of FIGS. 1-2. The transmitter component comprises the scanner module 41 and the waveguide 42 containing switchable grating elements 45A-45C which deflect light out of the TIR path into scanned beam ranges having the principal rays 1190-92 when in their diffracting states. The receiver component comprises the detector module 46 and the waveguide 47 containing the switchable grating elements 48A-48C which couple in signal light in the FOVs 1193-1195 into TIR paths to the detector module when in their diffracting states. The switching electors in the receiver and transmitter waveguides are not shown.

Figure 4:
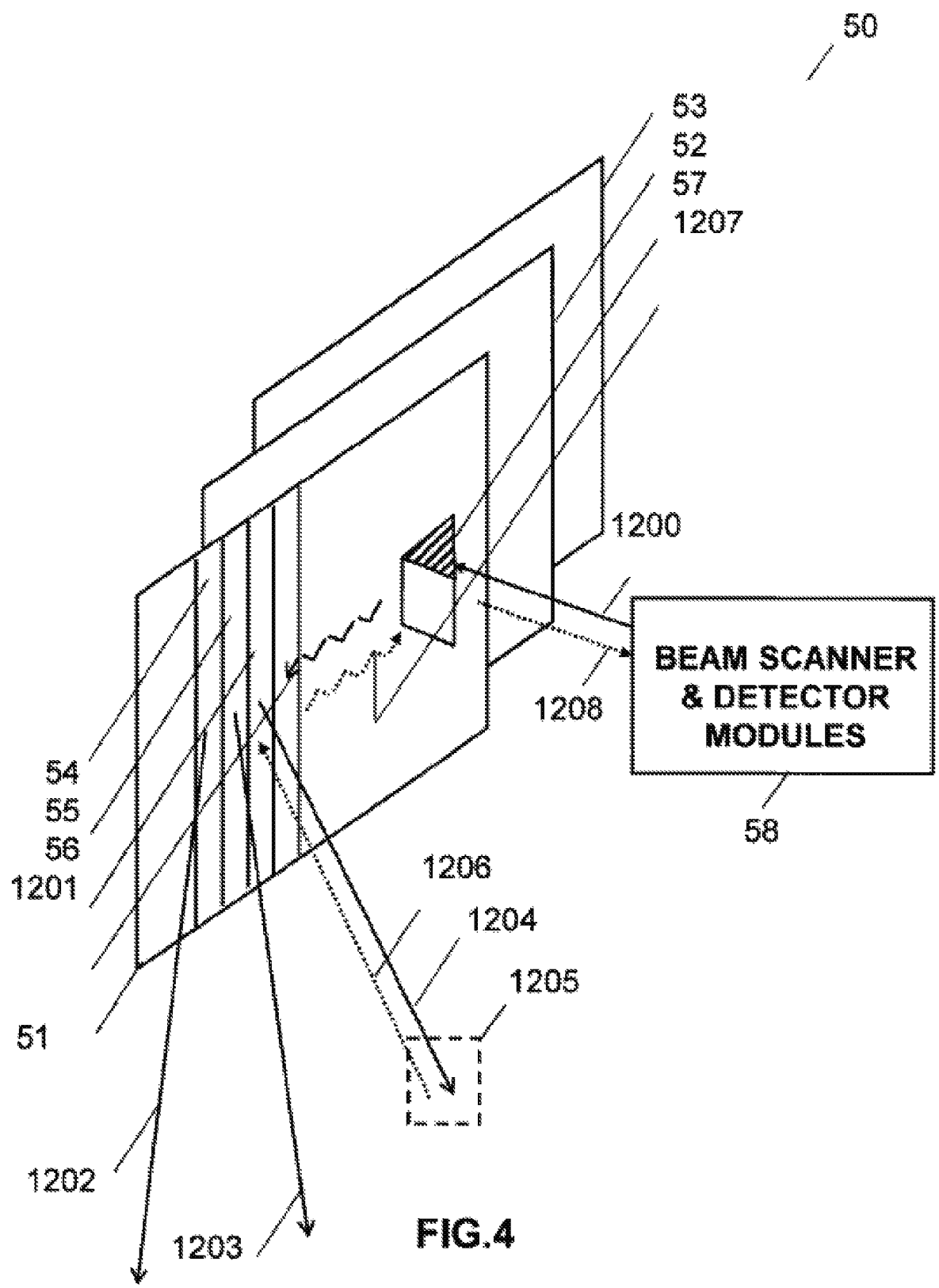
FIG. 4 is a schematic view of a LIDAR comprising multiple receiver-transmitter waveguide layers in one embodiment.

In one embodiment shown in FIG. 4 there is provided a LIDAR system 50 comprising a stack of waveguides 51-53 each containing SBG columns such as 54-56. The number of columns in a waveguide will depend on the grating angular bandwidth and the size of the overall field of view of the LIDAR. A scanned laser beam is coupled into each waveguide layer in turn via a coupling means such as a grating or prism. Alternatively, the laser beam may be edge coupled into the waveguide. Each waveguide layer may have a separate coupler designed to accept input beams in a predefined angular range. The coupler may employ at least one switching grating. A single coupler may be used to address multiple layers. In one embodiment the LIDAR may comprise a single waveguide layer. The SBG columns 54-56 have unique k-vectors for deflecting scanned laser beams into unique angular ranges with principal ray directions such 1202-1204. A scanned laser beam 1200 is coupled into the waveguides via a prism 57 into the TIR path 1201 in waveguide 51 and is deflected out of the waveguide 51 into a unique direction 1204 by an active (that is, diffracting) SBG column 56 according to the principles of the above described embodiments. The scanned laser beam irradiates a region 1205 of a remote reflective surface. The return signal 1206 reflected from the reflective surface is coupled into the waveguide 51 by the same active SBG column and relayed to the beam scanner and detector module 58 along the TIR path 1207 and an external path 1208 substantially parallel to the input beam path 1207. The transmitted and received laser beams are separated using beam splitting techniques that are well documented in the literature of laser sensors. The beams may be separated using polarization or angular selectivity. The detection system may employ heterodyne detection. The embodiment of FIG. 4 may be based on ones disclosed in WIPO Publication No. WO/2014/188149 entitled HOLOGRAPHIC WAVEGUIDE EYE TRACKER, US Patent Publication No. US 2018/0232048, entitled HOLOGRAPHIC WAVEGUIDE FOR TRACKING AN OBJECT IN 3D SPACE, and WIPO Publication No. WO/2013/167864 entitled APPARATUS FOR EYE TRACKING, which are incorporated herein by reference in their entireties. Said filings address eye trackers using SBG column array waveguides for infrared eye tracking. With some implementation modifications that will be obvious to those skilled in the art the embodiments disclosed therein are equally applicable to LIDAR systems. Each receiver transmitter (R/T) SBG element has unique a unique K-vector which together with the MEMs scanner sweep defines a unique FOV tile. This eliminates the need for complex, bulk and expensive rotating optics. Singe the target surfaces are typically at long range the beams entering the receiver waveguide are substantially collimated allowing optimal matching of R/T channels at all angles. Desirably the grating elements are designed to make the received element apertures as large as possible while the apertures of the transmitter elements need to be large enough to accommodate the laser beam sweep from the beam scanner. The beam width will be very narrow, typically of the order of millimetres.

The beam scanner and detector modules may be coupled to the transmission and receiver waveguides by an optical fibre. Multiple waveguides may be stacked to provide a larger field of view or to implement a hyper-spectral LIDAR with each waveguide operating within a defined wavelength band.

Figure 5:
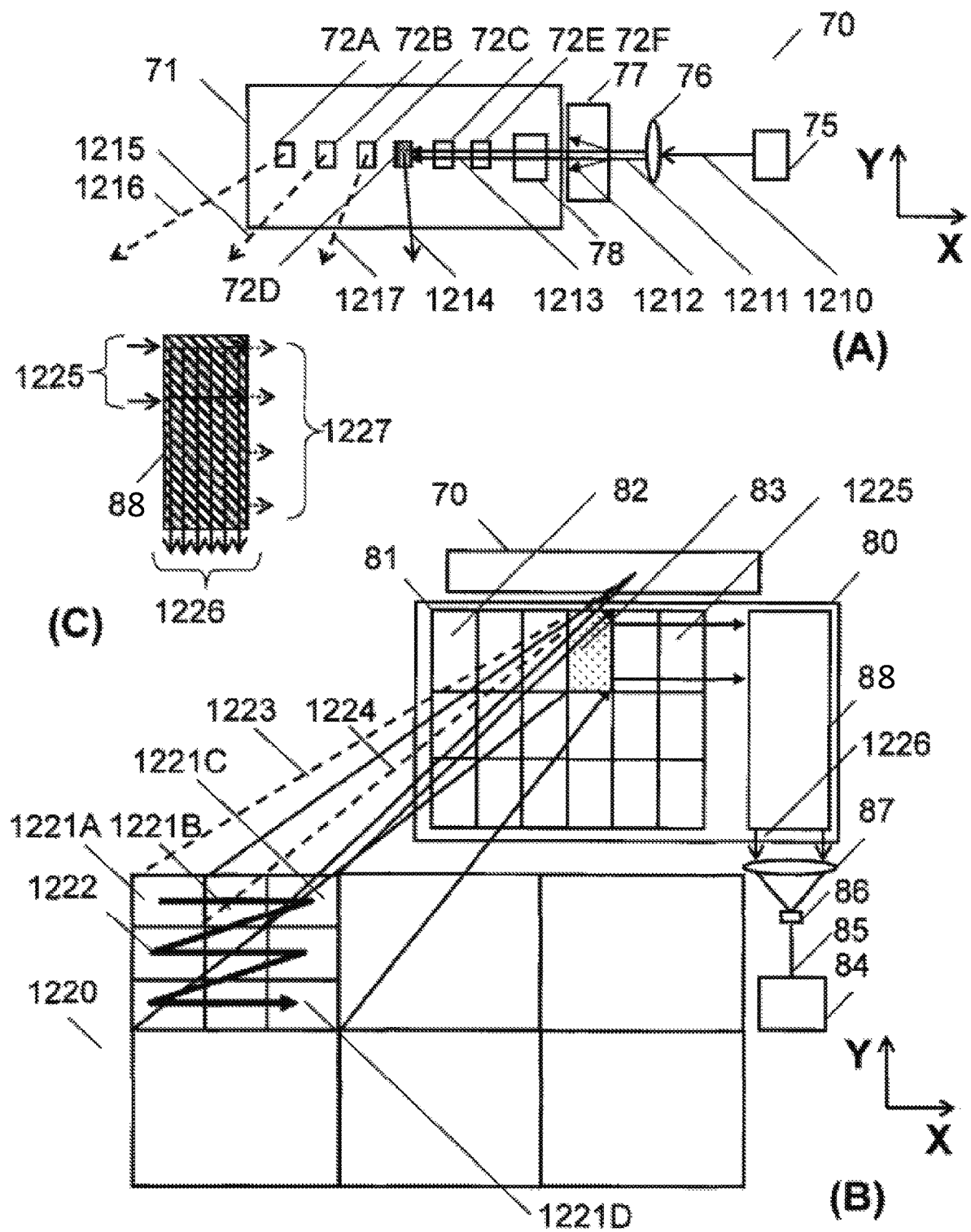
FIG. 5A is a schematic plan view of a LIDAR transmitter waveguide and laser scanner module in one embodiment.
FIG. 5B is a schematic plan view of a LIDAR receiver waveguide and detector module in one embodiment.
FIG. 5C is a schematic plan view of a detail of a LIDAR receiver waveguide in one embodiment.

In a further embodiment of the invention shown in FIG. 5 a LIDAR system 70 comprises a transmitter component 75 and a receiver component. The receiver component comprises a waveguide 71 containing a single row of switchable grating elements 72A-72F with an active grating indicated by 72D. Each grating has a unique k-vector corresponding to a unique beam diffraction direction. The transmitter component 75 further comprises a pulsed laser emitting the beam 1210, collimation and beam expansion optics indicated schematically by 76 forming the beam 1211 and a beam scanner module 77 for scanning the beam 1212 in two orthogonal directions. The scanned beam enters the waveguide via a coupling element 78 (typically a grating or prism). The component of the scanned beam in the waveguide X direction 1213 is shown for simplicity. The active grating element 72D deflects the beam 1213 in the direction 1214. Principal beam directions 1215-1217 corresponding to the active states of grating elements 72A-72C are indicated.

Turning now to FIG. 5B the detector waveguide 80 contains the SBG array 81 comprising elements such as 82 and 83 and a fold grating 88. To better understand the function of a fold grating note that the waveguide gratings in the previously discussed embodiments are tilted around an axis lying in the waveguide plane. Fold gratings have a more generalized tilt. In their simplest implementation, as used in the present invention they are tilted around an axis perpendicular to the waveguide plane such they deflect beams in the waveguide plane. More generally, they may have tilts defined by two rotation angles so that, for example, light can be coupled into the waveguide and deflected into an orthogonal direction inside the waveguide, all in one step. Of particular importance for the present invention, they can perform ninety degree turning and two-axis beam expansion in a single layer, avoiding orthogonal superimposed grating layers. FIG. 5C is a plan view of the fold grating 88. When rays 1225 encounter the grating, they diffract in a manner that changes the direction of propagation by 90°. Unlike a conventional vertical extraction grating, the light does not leave the waveguide. Note that when a ray encounters the grating, regardless of whether it intersects the grating from above or below, a fraction of it changes direction and the remainder continues unimpeded. A typical ray will interact many times with vertically (in the Y direction) while some light will be moving laterally (in the X direction). From a design perspective, it is desirable to engineer the amount of light 1226 emerging from the output edge of the grating to be uniformly distributed laterally and the amount of light 1227 emerging from the side edge of the grating to be as small as possible. Referring to the Cartesian XY reference frame in the figure, the fold grating turns the TIR light 1225 through ninety degrees into the Y direction. The light 1226 emerging from the fold grating is coupled out of the waveguide (prisms, grating or edge) and focused onto a IR detector 86 by the lens 87. The detector is connected to a signal processor 84 by an electrical communication link 85. Element 83, which is shown in its active state, couples signals from regions 1221A-1221D along the scan path 1222. For example, light from regions 1221A to 1221D in grid 1220 scanned by the instantaneous beams 1223,1224 is coupled by active element 83 which deflects the light into the TIR path in the direction 1225 (X-axis). In a typical application the laser has pulse duration of 5 ns. The laser power will depend on the application. In a typical automotive application, a LIDAR output power in the region of 60W may be required. The MEMS scanner is typically a single element scanner. Desirably the device (with the laser) should allow 1200×600 resolution cells across the field of view with 60 Hz update. In one embodiment a LIDAR is based on an array of 6×3 SBG gratings each having a field of view of 10°×10° giving a total field of view of 60°×30°. During the detector element active period 200×200 elements are swept out over the 10°×10° resulting in an angular resolution of 0.05°.

Figure 6:
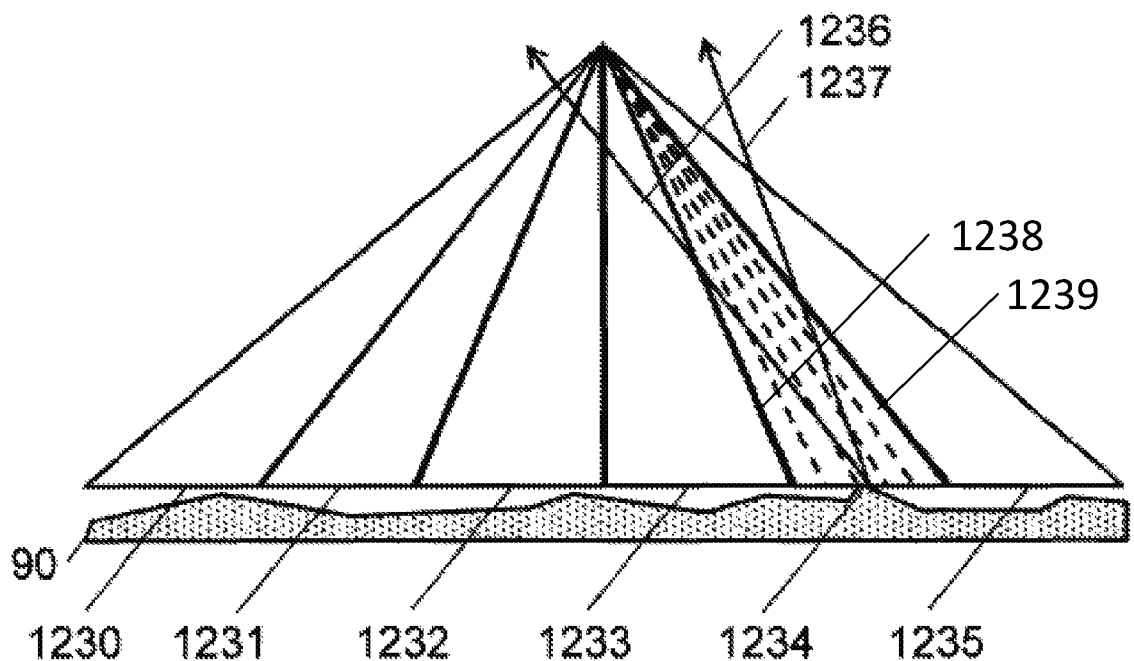
FIG. 6 is an illustration of the scanning geometry of a LIDAR in one embodiment.
Figure 7:
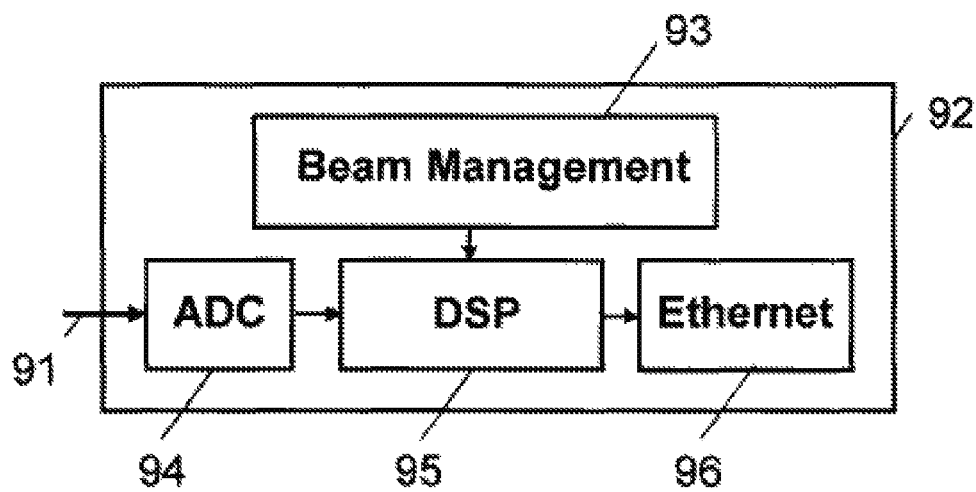
FIG. 7 is a block diagram of a LIDAR signal processor in one embodiment.

FIG. 6 illustrates the scanning geometry in more detail showing the scanned field of view regions formed by the transmitter which are labelled by 1230-1235. The backscatter signal from a reflective surface 90 is collected by a receiver over the angular range bounded by the rays 1236-1237. The beam scanner and the pulsed laser divide the field of view into discrete angular resolution elements such as 1238-1239. FIG. 7 is a block diagram of the signal processor 92. The data communication link from the receiver component transmits the received signal 91 to an analogue to digital converter (ADC) 94. The digitised signal is transmitted to a digital signal processor (DSP) module 95. Finally, the signal is communicated to peripheral devices via an Ethernet link 96. The modules operate under the control of the beam management executive program 93.

Figure 8:
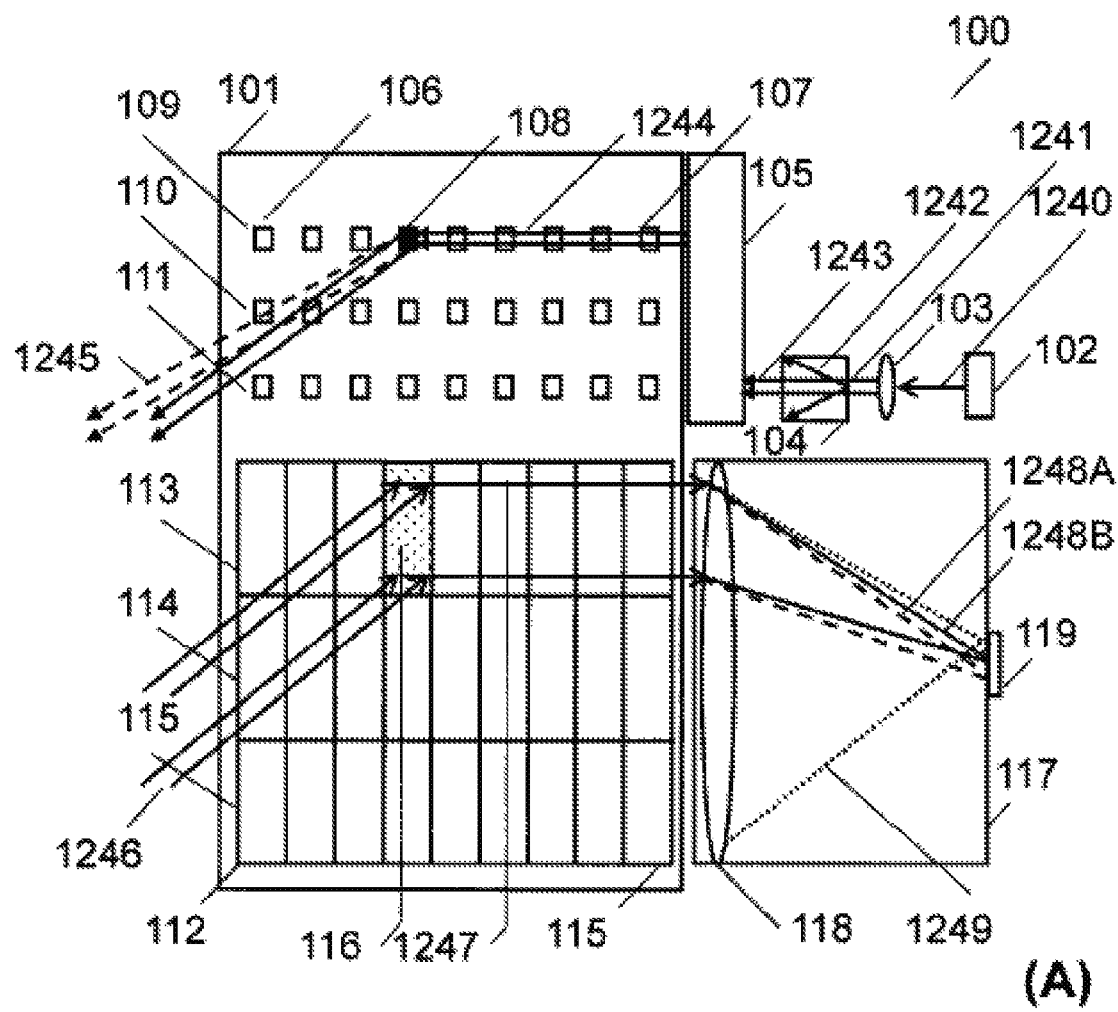
FIG. 8A is a schematic plan view of a LIDAR transmitter/receiver waveguide and beams scanner and detector modules in one embodiment.
FIG. 8B is a schematic plan view a beam steering module used in the embodiment of FIG. 8A.
Figure 8:
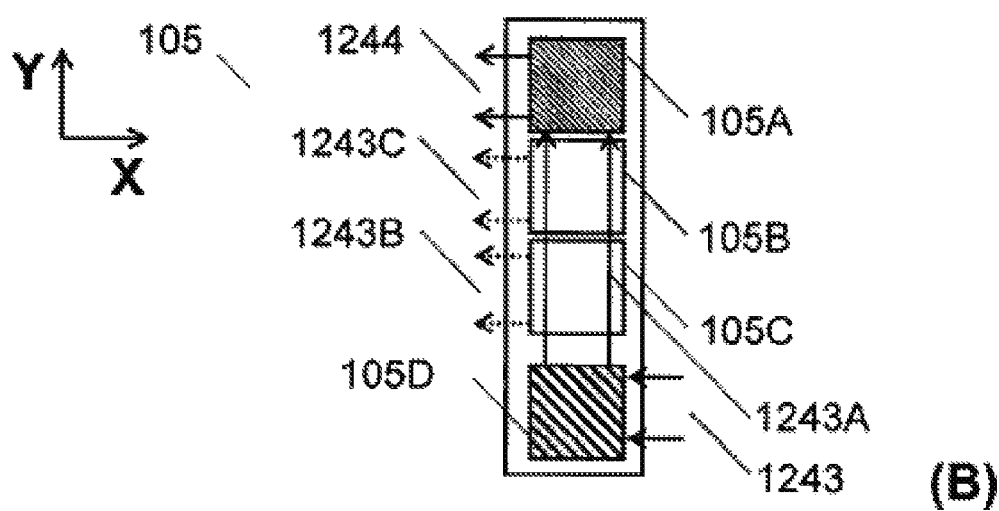

The embodiment of FIG. 8 is similar to the one of FIG. 5 except in that the transmitter component uses a two dimensional array of SBG elements and the fold grating in the receiver components is replaced by a large aperture detector lens. A further distinction is that in the FIG. 8 embodiment the transmitter and receiver components are integrated in one waveguide. The LIDAR 100 comprises a waveguide 101, a pulsed laser 102 emitted a beam 1240, a beam expansion/collimator lens system 103 providing the beam 1241, a beam scanner 104 producing the scanned beam represented by 1242, and a beam steering module 105 which provides a multiplicity of beam paths into the transmitter waveguide one of which, namely the beam 1244, is shown being injected into the waveguide along the SBG element row labelled 109. The beam steering module is illustrated in more detail in FIG. 8B. In one embodiment it comprises a set of three switchable fold grating elements 105A-105C and a non-switching fold grating 105D for steering the scanned beam 1243 of FIG. 8A into the vertical (Y) direction. The vertical beam 1243A crosses each of the switching fold grating elements in turn. Each element is operative to switch the scanned beam into the X direction into the transmitter waveguide. In FIG. 8B the element 105A is in its diffracting state and switches the beam into the output direction 1244. The elements 105B, 105C, which would otherwise switch the beam in the directions 1243B, 1243C shown by the dotted lines, are shown in their passive states. Not shown in FIG. 8B is a means for coupling the scanned beam 1243 into the beam steering module and for coupling the out beams from the beam steering module into the transmitter waveguide. As already discussed the coupling means may comprise a prism or grating. Alternatively, the beam may be injected into the edge of the waveguide. The transmitter portion comprises a two dimensional array of SBG elements such as 106-108. The rows are labelled by 109-111. The elements each have a unique k-vector defining a discrete horizontal and vertical field of view region. The active element scanned beam portion extracted from the waveguide by the active SBG element 108 is represented by the set of rays 1245. The receiver waveguide contains a two dimensional array of SBG elements 112 with rows starting with the elements labelled 113-115. The return signal which is indicated by the set of rays 1246 incident on the active element 116 is diffracted in the TIR path 1247 along the element row 113 and is coupled in to detector module 117 comprising the large aperture lens 118 and the IR detector 119. The lens focuses the guided beams onto the detector to form a focal spot of size determined by the range of angles detected by the element 116, as indicated by the dashed line rays 1248A, 1248B. The full range of angles detected (for all SBG element rows) is indicated by the dashed lines 1249. In one embodiment the detector module 117 is fold back over the receiver waveguide by means of mirrors or prisms to provide a more compact configuration. In one embodiment the lens 118 is replaced by an equivalent mirror. In another embodiment the lens 118 may be replaced by a holographic optical element.

Figure 9:
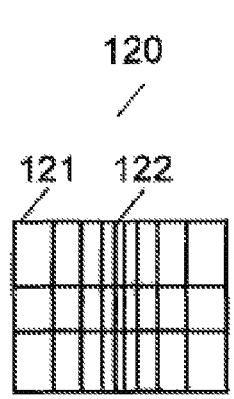
FIG. 9 is plan view showing the geometry of a SBG array used in a LIDAR receiver waveguide in one embodiment.

In one embodiment shown in FIG. 9 the widths of SBG elements in the receiver component SBG array 120 increase from the centre of the array (122) to the edge (121) in order to maintain a fixed detection aperture at all angles.

Figure 10:
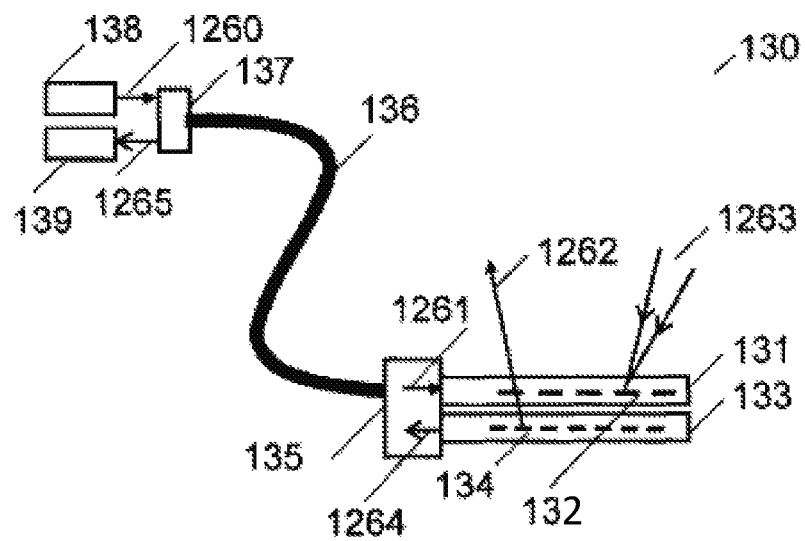
FIG. 10 is a schematic view of a LIDAR in which the transmitter and receiver waveguides are fiber-coupled to a beam scanner module and detector module in one embodiment.

The embodiment illustrated in FIG. 10 provides a fiber optic LIDAR 130 in which the transmitter 133 and receiver 131 waveguides are coupled to the scanner module 138 and the detector 139 module by an optical fiber 135, 136, 137. The optical fiber may be based on GRIN technology. The apparatus comprises a receiver waveguide 131 containing grating elements such as 132 for receiving light 1263 over an angular range, a transmitter waveguide 133 containing grating elements such as 134 for beam scanning light 1262 over a predefined angular range. An optical fiber coupler 135 couples the input 1261 to the transmitter waveguide and the output 1264 from the receiver waveguide to a remote transmitter/receiver module comprising a beam scanner 138 and detector module 139 and a coupler 137 for coupling transmitted beam 1260 and the received beam 1265 between the transmitter/receiver module and the fiber 136. The waveguides and the transmitter/receiver module may be based on any of the above described embodiments. Techniques for coupling signals to fibers will be well known to those skilled in the art.

Figure 11:
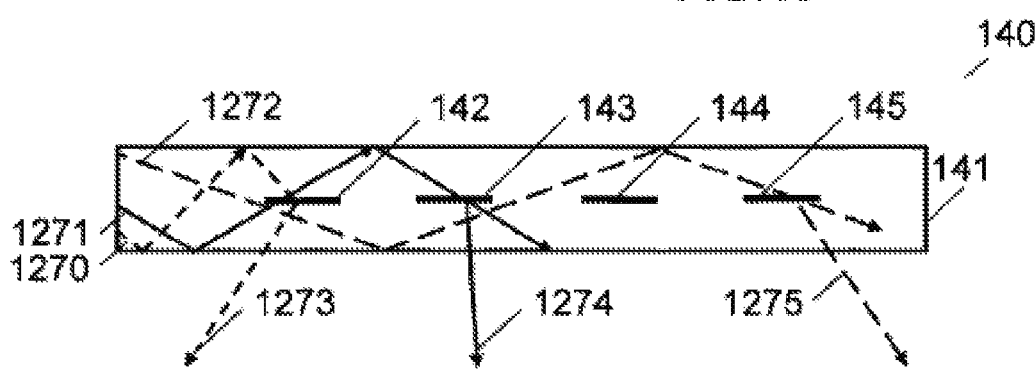
FIG. 11 is a schematic side view of a LIDAR transmitter waveguide using passive grating in one embodiment.

So far we have considered transmitter and receiver waveguides that use switching grating elements. FIG. 11 shows an embodiment in which the gratings elements are passive but are designed to operate within different TIR angle ranges. The apparatus 140 comprises a transmitter waveguide 141 containing grating elements 142-145. Each FOV range of the LIDAR corresponds to a unique SBG element and TIR range. The principal rays of three different TIR beams 1270-1272 and the diffraction of the TIR beams by the gratings 142,143,145 (in their diffracting states) into the transmitter beams 1273-1275 is shown. One way to ensure that the TIR angles are sufficiently well separated for this scheme to work is to design the grating to have a larger thickness and consequently a narrower angular bandwidth. Thick gratings are normally more difficult to switch, requiring higher switching voltages. A passive grating would be highly desirable in medical endoscopes. Note that FIG. 11 also serves to illustrate a either a passive transmitter waveguide or a passive receiver waveguide (reversing the ray vectors).

Figure 12:
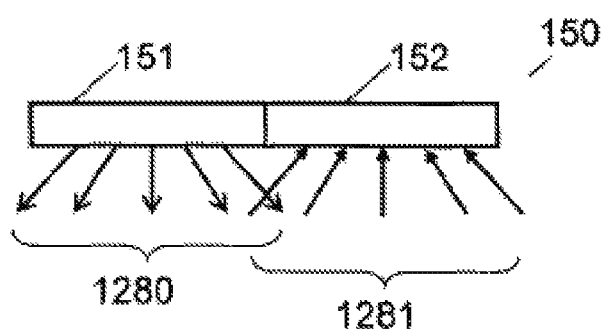
FIG. 12 is a schematic side view of a LIDAR waveguide in which transmitter and receiver waveguides are disposed adjacent each other.

In one embodiment shown in FIG. 12 a LIDAR 150 comprises transmitter 151 and receiver 152 waveguides abutting end to end. The waveguides may be based on any of the above described embodiments. The transmitted and received beam directions are generally indicated by 1280, 1281.

Figure 13:
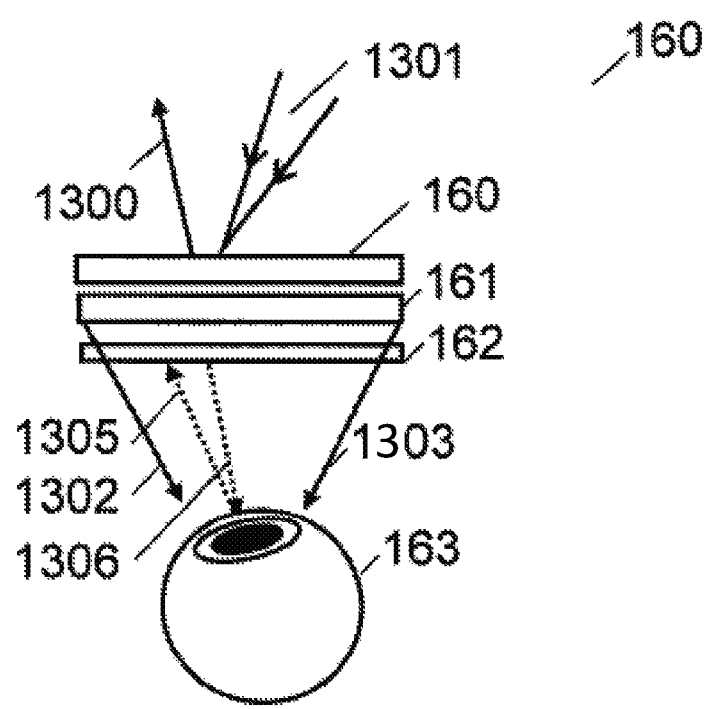
FIG. 13 is a schematic view of an eye tracked wearable waveguide display including a LIDAR waveguide layer.

In one embodiment shown in FIG. 13 there is provided an apparatus comprising a LIDAR 160 according to the principles of the invention, a waveguide display 161 and a waveguide eye tracker 162. The transmitted and received beams at the LIDAR are indicated by 1300,1301. The field of view provided by the display is indicated by the rays

1302,1303. The eye tracker illuminates the eye 163 with the infrared beam indicated by 1306 and detects the backscatter signal indicated by 1305. The waveguide display may be based on any of the embodiments disclosed in U.S. Pat. No. 9,075,184 entitled COMPACT EDGE ILLUMINATED DIFFRACTIVE DISPLAY, U.S. Pat. No. 8,233,204 entitled OPTICAL DISPLAYS, WIPO Publication No.: WO/20017/130130, entitled METHOD AND APPARATUS FOR PROVIDING A TRANSPARENT DISPLAY, WIPO Publication No.: WO/2013/027004 entitled WEARABLE DATA DISPLAY, U.S. Pat. No. 8,639,072 entitled COMPACT EDGE ILLUMINATED EYEGLASS DISPLAY, U.S. Pat. No. 9,341,846 entitled HOLOGRAPHIC WIDE ANGLE DISPLAY, and United States Patent Publication No.: US 2014/0140653 entitled COMPACT WEARABLE DISPLAY. The eye tracker may be based on any of the embodiments disclosed in WIPO Publication No.: WO/2014/188149 entitled HOLOGRAPHIC WAVEGUIDE EYE TRACKER, US Patent Publication No. US 2018/0232048 entitled HOLOGRAPHIC WAVEGUIDE FOR TRACKING AN OBJECT IN 3D SPACE, WIPO Publication No.: WO/2013/167864 entitled APPARATUS FOR EYE TRACKING.

Figure 14:
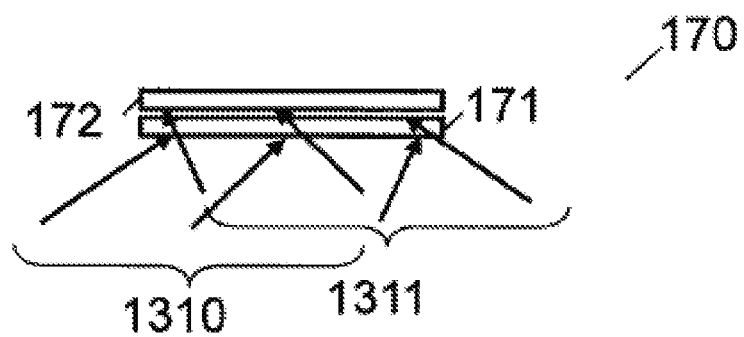
FIG. 14 is a schematic view of a LIDAR receiver waveguide stack comprising two waveguides operating over different fields of view.

In one embodiment shown in FIG. 14 a LIDAR receiver component 170 comprises a first waveguide 172 for receiving light from a first field of view indicated by the set of principal rays 1310 and a second waveguide 171 for receiving light from a second field of view indicated by the set of principal rays 1311. It should be apparent from the drawing that FIG. 14 may also be used to illustrate a LIDAR transmitter component (with the ray directions reversed).

The invention provides a transparent, thin architecture, using single laser/detector. The LIDAR uses SBG arrays for dividing the receiver and transmitter fields of view into small selectively switched field of view regions that can be detected more efficiency than would be the case if a singe wide angle imaging optical system were used.

Any of the embodiments of the invention may be implemented using either one dimensional or two dimensional grating arrays. In any of the above embodiments the waveguides may be curved or formed from a mosaic of planar or curved facets. It should be emphasized that the drawings are exemplary and that the dimensions have been exaggerated. For example, thicknesses of the SBG layers have been greatly exaggerated.

A waveguide device based on any of the above-described embodiments may be implemented using plastic substrates using the materials and processes disclosed in WIPO Publication No.: WO/2013/027006, entitled IMPROVEMENTS TO HOLOGRAPHIC POLYMER DISPERSED LIQUID CRYSTAL MATERIALS AND DEVICES. Advantageously, the SBGs are recorded in a reverse mode HPDLC material in which the diffracting state of SBG occurs when an electric field is applied across the electrodes. An eye tracker based on any of the above-described embodiments may be implemented using reverse mode materials and processes disclosed in the above PCT application. While the invention may be applied with gratings of any type including switching or non-switching gratings based on Bragg (volume) holograms, or surface-relief gratings the preferred grating technology is a SBG, which offers the advantages of fast switching, high optical efficiency and transparency and high index modulation. It should also be noted that the gratings used in the above embodiments are not necessarily all switching gratings. Switching gratings may be used in combination with passive grating technologies. As has been indicated by the description and drawings more than one grating layer (lamina) may be used. The grating layers discussed above are SBGs disposed between internal waveguide surfaces (or in other words sandwiched between transparent substrates) that combine to form the waveguide. However, in equivalent embodiments some of the gratings layers could be applied to external waveguide surfaces. This would apply in the case of surface relief gratings. The method of fabricating the SBG pixel elements and the ITO electrodes used in any of the above-described embodiments of the invention may be based on the process disclosed in the WIPO Publication No. WO/2007/130130, entitled METHOD AND APPARATUS FOR PROVIDING A TRANSPARENT DISPLAY.

It should be understood by those skilled in the art that while the present invention has been described with reference to exemplary embodiments, it is to be understood that the invention is not limited to the disclosed exemplary embodiments. Various modifications, combinations, subcombinations and alterations may occur depending on design requirements and other factors insofar as they are within the scope of the appended claims or the equivalents thereof.

What is claimed is:

1. A waveguide sensor, comprising:
   at least one waveguide;
   a source of first wavelength light;
   at least one beam deflector for scanning said light; and
   a detector optically coupled to said waveguide,
   said at least one waveguide supporting a first plurality of grating elements for deflecting said light into a predefined range of output directions and a second plurality of gratings for diffracting light reflected from external points to said detector.

2. The apparatus of claim 1 wherein said grating elements in the at least one waveguide are elements of a two dimensional array.

3. The apparatus of claim 1 wherein said grating elements in the at least one waveguide are elements of a one dimensional array.

4. The apparatus of claim 1 wherein said grating elements in the at least one waveguide are elongate elements with longer dimensions aligned orthogonally to the propagation direction of said waveguides.

5. The apparatus of claim 1 wherein said grating elements in the at least one waveguide are electrically switchable.

6. The apparatus of claim 1 wherein said grating elements in the at least one waveguide have at least one of aspect ratio or surface area varying across the waveguide.

7. The apparatus of claim 1 wherein the at least one waveguide is at least two waveguides that, wherein the at least two waveguides substantially overlap.

8. The apparatus of claim 1 wherein the at least one waveguide contains grating elements having at least two different grating vectors.

9. The apparatus of claim 1 wherein the at least one waveguide contains grating layers operating over different angular ranges.

10. The apparatus of claim 1 wherein the at least one waveguide includes at least one grating layer containing a fold grating.

11. The apparatus of claim 1 wherein the at least one waveguide comprises a transmitter waveguide and a receiver waveguide, which are combined into a single waveguide containing a multiplicity of grating elements disposed in at least one grating letter, each said element operative to diffract said light into a predefined range of output directions, each said element diffracting light reflected from external points and incident within a predefined angular range into a total internal reflection (TIR) path to said detector.

12. The apparatus of claim 1 configured to detect a 3D point cloud.

13. The apparatus of claim 1 wherein coupling between said beam deflector and the at least one waveguide is performed by one of a prism, a grating, a switchable grating, or via edge coupling.

14. The apparatus of claim 1 wherein said beam deflector is a micro-electro-mechanical system.

15. The apparatus of claim 1 wherein said source is an infrared light emitting diode or an infrared laser.

16. The apparatus of claim 1 wherein said first wavelength is approximately 1550 nm.

17. The apparatus of claim 1 wherein said grating is one of a Bragg Grating, a surface relief grating or a switchable Bragg grating recorded in a holographic polymer dispersed liquid crystal (HPDLC) material, a uniform modulation HPDLC material or a reverse mode HPDLC material.

18. The apparatus of claim 1 wherein the apparatus forms a layer in a stack forming at least one of a waveguide head-mounted display (HMD) or a waveguide eye tracker.

19. The apparatus of claim 1 further comprising a beam-splitter for providing optical paths between said source and said waveguide and said detector.

20. The apparatus of claim 1 wherein said detector is a heterodyne detection device.

* * * * *